United States Patent [19]

Gill

[11] 4,143,002

[45] Mar. 6, 1979

[54] CHALK-RESISTANT, MEDIUM TO DARK COLORED POLYURETHANES, POLYMER/POLYOL AND POLYISOCYANATE COMPOSITIONS FOR USE IN PRODUCING SAME AND METHODS FOR MAKING SAID POLYURETHANES

[75] Inventor: William A. Gill, Hurricane, W. Va.

[73] Assignee: Union Carbide Corporation, New York, N.Y.

[21] Appl. No.: 807,590

[22] Filed: Jun. 20, 1977

Related U.S. Application Data

[63] Continuation-in-part of Ser. No. 743,614, Nov. 22, 1976, abandoned.

[51] Int. Cl.$^2$ ............................................. C08J 9/00
[52] U.S. Cl. ...................................... 521/137; 252/1; 260/37 N; 260/45.75 M; 260/45.75 N; 260/45.75 P; 260/859 R; 521/124
[58] Field of Search .................. 260/2.5 BB, 45.75 N, 260/45.75 M, 45.75 P, 2.5 AM, 2.5 AK, 37 N, 33.2 R, 859 R, 859 PV; 252/1

[56] References Cited

U.S. PATENT DOCUMENTS

| | | | |
|---|---|---|---|
| 3,766,131 | 10/1973 | Arkles | 260/37 N |
| 3,847,871 | 11/1974 | Stephens et al. | 260/63 BB |
| 3,926,881 | 12/1975 | Kracklauer | 260/45.75 P |

FOREIGN PATENT DOCUMENTS 1,395,655 5/1975 United Kingdom.

OTHER PUBLICATIONS

*J. Polymer Science*; 1961; vol. 54; pp. 651–656.

*Macromolecules*; 1971; vol. 4; pp. 155–161, 291–297.

*J. Paint Technology*; 1974; vol. 46; pp. 35–40; and 1967, vol. 39, pp. 569–592.

*ACS Div. Org. Coatings and Plastics Chemistry*; 1975; vol. 35; pp. 251–254.

*Primary Examiner*—Lewis T. Jacobs
*Attorney, Agent, or Firm*—Eugene C. Trautlein

[57] ABSTRACT

Improvements in polymer/polyol compositions which are convertible by reaction with polyisocyanates to polyurethanes which are pigmented to a medium to dark color and which inherently chalk upon exposure to weather and wherein the polymer of the polymer/polyol composition is dispersed in the polyol thereof and is formed from one or more polymerizable ethylenically unsaturated monomers. The improvement provides to said polyurethanes resistance to chalking on exposure to weather and in one embodiment comprises the presence, in the polymer/polyol compositions used to make the polyurethanes, of a metallocene from the class consisting of ferrocene, ferrocene derivatives, cobaltocene and nickelocene in an amount effective to provide chalk resistance. Optionally, the metallocene can be present in the polyisocyanate composition instead of the polymer/polyol composition.

Improved dark colored polyurethanes are made by reacting a mixture comprising (a) a polymer/polyol composition and (b) an organic polyisocyanate in the presence of (c) a catalyst for the reaction of (a) and (b), (d) a metalocene, preferably ferrocene, or a ferrocene polymer and (e) a medium to dark pigment to produce the polyurethane.

25 Claims, No Drawings

CHALK-RESISTANT, MEDIUM TO DARK COLORED POLYURETHANES, POLYMER/POLYOL AND POLYISOCYANATE COMPOSITIONS FOR USE IN PRODUCING SAME AND METHODS FOR MAKING SAID POLYURETHANES

RELATED APPLICATION

This application is a continuation-in-part of U.S. patent application Ser. No. 743,614, filed Nov. 22, 1976 now abandoned.

BACKGROUND OF THE INVENTION

1. Field of the Invention

The invention relates to novel improved polyurethanes that are resistant to chalking upon exposure to weather and to novel improved polymer/polyol compositions for making said improved polyurethanes. The invention also relates to novel improved polyisocyanate compositions for making said polyurethanes and to novel methods for making same.

2. Description of the Prior Art

Polymer/polyol dispersions have been and currently are being used in the production of pigmented polyurethane products having a wide variety of desirable properties. When pigmented to medium or dark colors such as red, blue, green or black and exposed to weather such polyurethane products inherently chalk and therefore are unsuitable for use as automotive bumpers, fascia, trim and other objects designed for outdoor applications.

The prior art discloses no solution to this problem. The present invention is based on the discovery that metallocenes, such as, cobaltocene, nickelocene, ferrocene derivatives and, preferably ferrocene and its polymers, when present in suitable amounts in these medium to dark pigmented polyurethane products, impart resistance to chalking. No prior art has been found which teaches or suggests improvements in chalk resistance by the incorporation of a metallocene into polyurethanes made from polymer/polyols.

Metallocenes, and ferrocene in particular, and their derivatives have been used in polymers and resins for a wide variety of purposes. The effects of UV and infrared light in space environments on a wide variety of organic coatings containing ferrocene derivatives such as benzoyl ferrocene were reported by R. G. Schmitt and R. C. Hirt in *J. Applied Polymer Science*, Vol. 7, pp. 1565–1580 (1963). This study included a polyurethane polymer made from a polyester resin and polyisocyanate but does not mention any polyurethane polymer made with a polymer/polyol. Unsubstituted ferrocene was not used. Furthermore, the study was not concerned with chalking effects or the reduction of same.

British Pat. No. 1,406,581 is concerned with the use of ferrocene as a smoke suppression agent for polyurethanes made with a polyol other than a polymer/polyol. Chalking problems or their prevention are not mentioned.

Ferrocene was discovered in 1951 (*Nature*, 168, 1039, 1951; *J. Chem. Soc.*, 632, 1952) and was first incorporated into a polymer in 1955 when vinylferrocene was polymerized (*J. Am. Chem. Soc.*, 77, 6295, 1955). Since then a significant amount of research effort has been devoted to metallocene polymers although, for reasons of availability and a well-explored chemistry of the parent compound, most polymers investigated have been derivatives of ferrocene ("Metallocene Polymers", Marcel Dekker, New York, 1970). Ferrocene readily undergoes electrophilic substitution reactions, tends to stabilize carbonium ions and radicals that are alpha to the cyclopentadienyl rings, is thermally stable (up to 500° C.), (F. A. Cotton and G. Wilkinson, "Advanced Inorganic Chemistry", Interscience, New York, N.Y., 1972), may be reversibly oxidized to the ferricinium ion, (*Polymer Science, USSR*, 15(2), 358 (1973), acts as a photochemical sensitizer as well as a quencher of photochemically generated triplet states, is an efficient UV screening agent, may promote semiconductivity in polymers, and has demonstrated a beneficial effect on glass transition temperature (Tg) of acrylate polymers (*Chem. Tech.*, 1, 416 (1971). These properties and others have prompted the synthesis of a wide variety of ferrocene polymers during the past 20 years, most of which are described in a number of fine reviews. ("Metallocene Polymers", Marcel Dekker, New York, 1970; *Polymer Science, USSR*, 15(2), 358, 1973; *Chem. Tech.*, 1, 416, 1971; *Advan. Macromol. Chem.*, 1, 1, 1968; *J. Organometal, Chem.*, Annual Survey Covering The Year 1973, 79, 278, 1974).

Ferrocene polymers are for the most part prepared by either free-radical techniques or acid-catalyzed condensations. The ferrocene nucleus may be pendent on the polymeric chain or part of the polymer backbone. As part of the polymer backbone the ferrocene may be linked heteroannularly or homoannularly and, if homoannularly linked, may exhibit 1, 2 or 1, 3 isomers. Included among polymers in which ferrocene is part of the polymer backbone are polyferrocenylenes, (*Dokl. Akad. Nauk. SSSR*, 132, 360, 1960; *Dokl. Akad. Nauk. SSSR*, 138, 125, 1961; *J. Organometal. Chem.*, 6, 76, 1966; H. Rosenberg and al., 2nd International Symosium on Organometallic Chemistry, Madison, Wisconsin, 1965; Abstr. Proc., p. 42; *J. Organometal. Chem.*, 4, 475, 1965; *J. Electrochem. Soc.*, 110, 15, 1963; British Pat. 1,136,699, 1968) an assortment of carbon-bridged ferrocene polymers, (*J. Polymer Sci.*, C4, 1481, 1964; *J. Org. Chem.*, 30, 4071, 1965; *J. Polymer Sci.*, A3, 1499, 1965; *Nature*, 204, 179, 1964; *Plaste Kautschuk*, 10, 32, 1963; *J. Polymer Sci.*, (A-1)7, 2689, 1969; *Dokl. Akad. Nauk. SSSR*, 121, 299, 1958; U.S. Pat. No. 3,350,369) and ferrocene polymers bridged with heteroatoms such as oxygen (*J. Macromol. Chem.*, 1, 611, 1966; *J. Macromol Chem.*, 1, 595, 1966) nitrogen, (*Polymer Science, USSR*, 15(2),358, 1973), boron (*J. Macromol. Sci.*, A2, 751, 1968; H. Rosenberg and F. L. Hedberg, 3rd International Symposium on Organometallic Chemistry, Munich, 1967; Abstr., p. 108) and silicon (*J. Org. Chem.*, 26, 1790, 1961; U.S. Pat. No. 3,060,215; *Makromol. Chem.*, 83, 148, 1965; *Am. Chem. Soc. Org. Coatings Plastics Preprints*, 31, 264, 1971; *J. Polymer Sci. Polymer Chem. Ed.*,12, 837, 1974). Polymers with ferrocene pendent on the polymer chain include poly(vinylferrocenes), (*J. Am. Chem. Soc.*, 77, 6295, 1955; *Chem. Tech.*, 1, 416, 1971; W. P. Fitzgerald, Jr., Ph.D. Thesis, Purdue U., West Lafayette, Ind., 1963; *J. Polymer Sci., Polymer Chem. Ed.*, 13, 1049, 1975; *Macromolecules*, 3, 746, 1970; *J. Macromol. Sci. Chem.*, A8(5), 923, 1974) poly(ferrocenylacrylates) (*Chem. Tech.*, 1, 416, 1971; *J. Polymer Sci.*, C(4), 1481, 1966) poly(ethynylferrocenes) and other conjugated polymers, and poly(ferricinium) salts (*Chem. Tech.*, 1, 416, 1971; *J. Polymer Sci.*, C(4), 1481, 1966).

A wide variety of polymers containing ferrocene and ferrocene derivatives such as vinyl ferrocene and other ferrocene monomers and polymers and copolymers have been reported in the literature including *Organometallic Compounds*, Sept. 5, 1975, Vol. 27, pages 156–166 and the references cited therein; *J. Polymer Science*, 1961, Vol. 54, pp. 651–656; *Macromolecules*, 1971, Vol. 4, pp. 155–161, 291–297; *J. Paint Technology*, 1974, Vol. 46, pp. 35–40; *J. Paint Technology*, 1967, Vol. 39, pp. 569–592; *ACS Div. Org. Coatings and Plastics Chemistry*, 1975, Vol. 35, pp. 251–254; U.S. Pat. Nos. 3,847,871 and 3,926,881 and British Pat. No. 1,395,655. None of these reports, patents or references cited in any of them mention polyurethanes made from polymer/polyols, chalking of such polyurethanes when subjected to weathering or the prevention of such chalking.

SUMMARY OF THE INVENTION

The present invention is based on the discovery that the incorporation of a small amount of a metallocene, such as, ferrocene, a ferrocene derivative, cobaltocene or nickelocene in a medium to dark colored polyurethane, which is made from a polymer/polyol and which undergoes surface chalking upon exposure to weather, imparts chalk resistance to the polyurethane.

Infrared analysis of the chalk scraped from the surface of unprotected, black pigmented, polymer/polyol based polyurethanes that had been subjected to accelerated, simulated weathering conditions indicated the chalk to comprise mainly the polymer segment of the polymer/polyol employed in the maufacture of the polyurethane. Without wishing to be bound to any theory, it has been theorized that the weathering process was dissipating the urethane network at the surface thus exposing the vinyl polymer or fragments thereof as a white chalk. The metallocene can be incorporated in the polymer/polyol composition prior to mixing and reaction with the polyisocyanate or it may be incorporated into the polyisocyanate composition prior to mixing and reaction with the polymer/polyol. The present invention thus provides novel polymer/polyol compositions, novel polyisocyanate compositions and novel polyurethanes containing a metallocene. The present invention also provides methods for producing polyurethanes having improved resistance to chalking from polymer/polyols and polyisocyanates. The invention is applicable to foamed as well as unfoamed polyurethane products such as black exterior automotive parts including bumper rub strips, bumper guards, side moldings and full bumpers. The invention eliminates the need for protective weather resistant coatings and renders the polymer/polyol-based, medium to dark pigmented polyurethanes suitable for a wide variety of outdoor applications.

DESCRIPTION OF SPECIFIC EMBODIMENTS

The polymer/polyol compositions of this invention are liquid, stable dispersions of a polymer in a polyol and contain a metallocene from the class consisting of ferrocene (bis-cyclopentadienyl iron) and derivatives thereof (e.g., ferrocene polymers), nickelocene (bis-cyclopentadienyl nickel) and cobaltocene (bis-cyclopentadienyl cobalt) in an amount effective to impart resistance to weather-induced surface chalking of polyurethanes made from the polymer/polyol compositions. The precise amount of metallocene used is not narrowly critical and can vary over wide ranges. Amounts of ferrocene of about 0.035 weight percent or less based on the weight of the polyurethane product are effective as well as amounts as high as about 2.5 weight percent or more based on the weight of the polyurethane product. Amounts of ferrocene derivative, e.g., the ferrocene polymers such as 2,2-diferrocenyl-propane polymer, of about 0.007 to about 0.7 weight percent or higher based on the weight of polyurethane are effective. The metallocenes mentioned above are well known and reference is made to *J. Paint Technology*, 1967, Vol. 39, pp. 576–584, and literature cited therein for details regarding the preparation and properties of these metallocenes. The ferrocene derivatives disclosed in U.S. Pat. No. 3,926,881 and the references set forth therein in Columns 2 and 3, are suitable for use in this invention and the disclosure of such derivatives in this patent and in said references cited therein are incorporated herein by reference. The chlorinated paraffins required for the purposes of U.S. Pat. No. 3,926,881 provide no special advantage in the present invention and can be omitted if desired. In fact, the presence of chlorinated paraffins can be detrimental in the present invention from the standpoint of imparting too much plasticization or possibly hindering the catalysis in the polyurethane-forming reaction.

The polymer/polyols present in the novel polymer/polyol compositions of this invention are also well known, the basic patents being the Stamberger patents, U.S. Pat. Nos. 3,304,273; 3,383,351, Re. 28,715 (reissue of 3,383,351) and 3,523,093. Later disclosures of polymer/polyols include the Scharf et al and Kuryla Canadian Pat. Nos. 735,010 and 785,835; the Pizzini et al U.S. Pat. No. 3,823,201; the Ramlow et al U.S. Pat. application Ser. No. 431,080, filed Jan. 7, 1974; the Ramlow et al patent U.S. Pat. No. 3,953,393; and the DeWald U.S. Pat. No. 3,655,553. These as well as any other suitable polymer/polyol can be employed herein.

The polymer of the polymer/polyol is formed by polymerizing one or more polymerizable ethylenically unsaturated monomers.

The proportion of polymer in the polymer/polyol can range from about 4 to about 50 weight percent, preferably from about 15 to about 35 weight percent, based on the total weight of the polymer/polyol. The polymer is preferably formed in situ.

Substantially any of the polyols previously used in the art to make polymer/polyols can be used in this invention. Illustrative of the polyols useful in producing polymer/polyol compostions of this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2- 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like. A preferred class of alkylene oxide adducts of polyhydroxyalkanes are the propylene oxide adducts and the propylene oxide-ethylene oxide adducts of di- and/or trihydroxyalkanes.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyols employed can have hydroxyl numbers which vary over a wide range. In general, the hydroxyl numbers of the polyols employed in the invention can range from about 20, and lower, to about 850, and higher. The hydroxyl number is defined as the number of milligrams of potassium hydroxide required for the complete hydrolysis of the fully acetylated or phthalated derivative prepared from 1 gram of polyols. The hydroxyl number can also be defined by the equation:

$$OH = \frac{56.1 \times 1000 \times f}{m.w.}$$

where OH = hydroxyl number of the polyol $f$ = functionality, that is, average number of hydroxyl groups per molecule of polyol $m.w.$ = molecular weight of the polyol.

The exact polyol employed depends upon the end-use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of from about 50 to about 150 for semi-flexible foams and from about 30 to about 70 for flexible foams but can be as low as 20. Such limits are not intended to be restrictive, but are merely illustrative of the large number of possible combinations of the above polyol coreactants.

The most preferred polyols employed in this invention include the poly(oxypropylene) glycols, triols and higher functionality polyols. These polyols also include poly(oxypropylene-oxyethylene) polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. Most preferably, the ethylene oxide when used is incorporated as terminal blocks, i.e., capping units. As is well known in the art, the polyols that are most preferred herein contain varying amounts of unsaturation. As taught by Stamberger, unsaturation in itself does not affect in any adverse way the formation of the polymer/polyols used in the present invention except in the case where the extent or type of unsaturation is so high or effective as to result in a gel or solid.

The polymerizable ethylenically unsaturated monomers which can be used in making the polymer/polyols employed in this invention include the polymerizable ethylenically unsaturated hydrocarbon monomers and polymerizable ethylenically unsaturated organic monomers the molecules of which are composed of carbon, hydrogen and at least one of O, S, or N. These monomers are characterized by the presence therein of at least one polymerizable ethylenic unsaturated group of the type C═C. The monomers can be used singly or in combination to produce homopolymer/polyol or copolymer/polyol reactive compositions.

These monomers are well known in the art and include the hydrocarbon monomers such as styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; the acrylic and substituted acrylic monomers such as acrylic acid, methacrylic acid, methyl acrylate, 2-hydroxyethyl acrylate, 2-hydroxyethyl methacrylate, methyl methacrylate, octyl methacrylate, acrylonitrile, methacrylonitrile, 2-ethylhexyl acrylate, phenyl acrylate, phenyl methacrylate, N,N-dimethylacrylamide, and the like; the vinyl esters, vinyl ethers, vinyl ketones, etc., such as, vinyl acetate, vinyl alcohol, vinyl butyrate, vinyl acrylate, vinyl methacrylate, N-vinyl-pyrrolidone, and the like; the vinyl halides and vinylidene halides, such as, vinyl chloride, vinyl fluoride and vinylidene chloride and the like; t-butylaminoethyl methacrylate, glycidyl acrylate, allyl alcohol, vinyl pyridine, and the like. Any of the known polymerizable monomers can be used and the compounds listed above are illustrative and not restrictive of the monomers suitable for use in this invention. Any of the known chain transfer agents can be present if desired.

The preferred monomer used to make the polymer of the polymer/polyol used in this invention is acrylonitrile alone as a homopolymer or in combination with styrene or methyl methacrylate as a copolymer. The relative weight proportions of acrylonitrile to styrene illustatively range from about 20:80 to about 100:0, preferably from about 25:75 to 100:0 and more preferably, when low molecular weight polyols, e.g., below about 2000 are used, then the weight ratio should be from about 60:40 to about 85:15.

Catalysts useful in producing the polymer in the polymer/polyol compositions of this invention are the free radical type of vinyl polymerization catalysts such as the peroxides, persulfates, perborates, percarbonates and the azo compounds or any other suitable catalyst specified in the above-mentioned patents and application. Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate and the like. Azobis(isobutyronitrile) is the preferred catalyst since it does not impart any objectionable product odor or require special handling in the plant because of possible hazards.

The catalyst concentration is not critical and can be varied within wide limits. As a representative range, the concentration can vary from about 0.1 to about 5.0 weight percent, based upon the total feed to the reactor. Up to a certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

The polymerization can also be carried out with an inert organic solvent present that does not dissolve the polymer. Illustrative thereof are toluene, benzene, and the like, including those known in the art as being suitable solvents for the polymerization of vinyl monomers. The only requirement in the selection of the solvent and the polyol is that they do not interfere with the monomer's polymerization reaction. When an inert organic solvent is used, it is generally removed from the reaction mixture by conventional means before the polymer/polyol is used to produce polyurethane foams.

The temperature range used in the polymerization is not critical and may vary from about 80° C. or less to about 150° C. or perhaps greater, the preferred range being from about 105° C. to about 135° C. The catalyst and temperature should be selected so that the catalyst has a reasonable rate of decomposition with respect to the hold-up time in the reactor for a continuous flow reactor or the feed time for a semi-batch reactor.

The preferred process used in producing the polymer/polyols used in this invention involves polymerizing the monomers in the polyol while maintaining a low monomer to polyol ratio throughout the reaction mixture during the polymerization. This provides in the preferred case a polymer/polyol in which essentially all of the polymer particles have diameters of less than thirty microns and in some cases less than one micron. Such low ratios are achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. The process can be carried out in various manners such as by a semi-batch reaction, a continuous back-mixed stirred tank reactor, etc. For the latter, a second stage may be used to incrementally increase the conversions of monomers. The mixing conditions employed are those attained using a back-mixed reactor (e.g., a stirred flask or stirred autoclave). Such reactors keep the reaction mixture relatively homogeneous and so prevent localized high monomer to polyol ratios such as occur in certain tubular reactors (e.g., in the first stages of "Marco" reactors when such reactors are operated conventionally with all the monomer added to the first stage).

When using a semi-batch process, the feed times can be varied (as well as the proportion of polyol in the reactor at the start versus polyol fed with the monomer) to effect changes in the product viscosity. Generally, longer feed times result in higher product viscosities and may allow use of slightly broader acrylonitrile to styrene ranges for a given polyol and polymer content.

The crude polymer/polyol usually contains small amounts of unreacted monomers. Such residual monomers can be converted to additional polymer by employing a two-stage operation in which the product of the first stage (back-mixed reactor) is passed into a second stage which can be a Marco reactor operated conventionally or an unstirred tank reactor.

The preferred temperature used in producing polymer/polyols used in this invention is any temperature at which the half life of the catalyst is no longer than about 25 percent of the residence time in the reactor. As an illustration, the half life of the catalyst at a given reaction temperature may be no longer than six minutes (preferably no longer than from 1.5 to 2 minutes). The half lives of the catalysts become shorter as the temperature is raised. By way of illustration, azo-bis-isobutyronitrile has a half life of six minutes at 100° C. The maximum temperature used is not narrowly critical but should be lower than the temperature at which significant decomposition of the reactants or product occurs.

In the process used to produce the polymer/polyols used in this invention, the monomers are preferably polymerized in the polyol. Usually, the monomers are soluble in the polyol. It has been found that first dissolving the monomers in a minor portion of the polyol and adding the solution so formed to the remainder of the polyol at reaction temperature facilitates mixing the monomers and the polyol and can reduce or eliminate reactor fouling. When the monomers are not soluble in the polyols, known techniques (e.g., dissolution of the insoluble monomers in another solvent) can be used to disperse the monomers in the polyol prior to polymerization. The conversion of the monomers to polymers achieved by this process is remarkably high (e.g., conversions of at least 72% to 95% of the monomers are generally achieved).

In the case of copolymerizing acrylonitrile and styrene the ratio of acrylonitrile to styrene in the polymer is always slightly lower than the ratio of acrylonitrile to styrene monomer in the feed because the styrene tends to react slightly faster than the acrylonitrile. For example, if acrylonitrile and styrene monomers were fed at a weight ratio of 80:20, the resulting polymer would have an acrylonitrile to styrene weight ratio of about 79:21 or 78:22.

The preferred polymer/polyols used in the present invention comprise dispersions in which the polymer particles (the same being either individual particles or agglomerates of individual particles) are relatively small in size and, in the more preferred embodiment are all essentially less than 30 microns. This insures that the polymer/polyol can be successfully processed in all types of the relatively sophisticated machine systems now in use for large volume production of polyurethane products, including those employing impingement-type mixing which necessitate the use of filters that cannot tolerate any significant amount of relatively large particles. Less rigorous applications are satisfied when less than essentially all particles are of a size of 30 microns.

The polymer concentration of the polymer/polyols used in this invention can be adjusted by the addition of additional polyol of the general type described above to provide the polymer concentration suitable for the desired end use. In this manner, the polymer/polyols can be produced at polymer concentrations of, for example, 20%, and reduced to polymer concentrations as low as 4% by the addition of more polyol, or, alternatively, the composition can be made directly with a polymer concentration of 4% by the method described above.

The novel polyisocyanate compositions comprise a polyisocyanate of any of the well known types which is reactive with the chosen polymer/polyol to produce the desired polyurethane product and a metallocene, preferably ferrocene, in an amount effective to provide resistance to chalking. The amount of ferrocene based on the polyurethane product can vary over a wide range and can be as low as 0.035 weight percent or less and as much as 0.7 weight percent or higher. The polyisocyanate composition can contain other ingredients such as pigment and, when foam is being produced, a foam stabilizer, although it is usually preferable to incorporate these other ingredients by way of the polymer/polyol composition. While it is contemplated that the ferrocene or other metallocene would be incorporated into the polyurethane product through either the novel polymer/polyol composition or the novel polyisocyanate composition of this invention, it can be incorporated partly through the novel polymer/polyol composition and partly through the novel polyisocyanate composition in respective amounts such that the total amount in the resulting polyurethane product constitutes an effective amount to provide the desired resistance to surface chalking.

Any compatible medium to dark colored pigment can be used in the novel compositions of this invention. Carbon black is extensively used as a pigment in polyurethane products and is included as a preferred pigment for use in this invention. Other useful pigments include Prussian blue, manganese violet, manganese blue, emerald green, cobalt blue, cobalt violet, Mayan blue, iron oxide red, chrome red, vermillion. ultramarine blue, ultramarine violet, phthalocyanine green and brilliant red. The amounts of pigments used are not narrowly critical and depend in large part on the shade of medium to dark color desired. Illustrative ranges are from about 0.1 to about 4 weight percent, preferably about 0.3 to about 2 weight percent of the pigment based on the weight of the polyurethane product. Larger amounts of pigment can be used although difficulties with mixing and handling the larger amounts of pigments can result because of increased viscosity. The pigment can be incorporated into the polymer/polyol composition, the polyisocyanate composition, or both.

The present invention also provides novel polyurethane products made with the novel polymer/polyol compositions and novel methods for producing such products. The novel polyurethane products are prepared by reacting (a) a polymer/polyol as described above, and (b) an organic polyisocyanate, in the presence of (c) a catalyst for the reaction of (a) and (b) to produce the polyurethane product, and (d) a metallocene, preferably ferrocene or a ferrocene polymer, and (e) a medium to dark pigment and, when a microcellular urethane elastomer or foam is being prepared, (f) a blowing agent and usually (g) a foam stabilizer. More specifically, the novel method can be conducted by reacting a novel polymer/polyol composition as described above with a suitable organic polyisocyanate, or a novel polyisocyanate composition as described above with a suitable polymer/polyol, or a novel polymer/polyol composition with a suitable novel polyisocyanate composition, to produce the desired polyurethane. The reaction (and foaming operations, if employed) can be performed in any suitable manner, preferably by the one-shot technique, although the prepolymer technique can be used if desired.

The organic polyisocyanates that are useful in producing the novel polyisocyanate compositions and polyurethane products in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess tolylene diisocyanate and short chain polyoxypropylene diols or triols, are preferred in those instances where ease of processing such materials is desired. The polyisocyanates are well known in the art. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanato-dodecane,bis-(isocyanatohexyl) sulfide, 1,4-diisocyanatobenzene, 2,4-diisocyanatotoluene, 2,6-diisocyanatotoluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenyl-methylene diisocyanate, 2,4'-diphenylmethylene diisocyanate, modified diphenylmethylene diisocyanates modified with carbodiimides to liquefy same, and polymethylene poly(phenylene-isocyanates) having the formula:

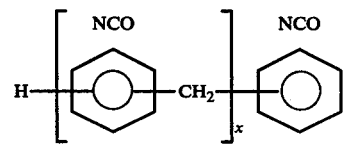

wherein $x$ has an average value from 1.1 to 5 inclusive (preferably from 2.0 to 3.0), and mixtures thereof.

The catalysts that are useful in producing polyurethanes in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylanolamine, 1,4-diazabicyclo[2.2.2] octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis-(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

The distinction between polyurethane foams and elastomers is not sharply defined because all foams and most elastomers contain a gas phase. The foams in general have densities of less than 10 pounds per cubic foot and elastomers, in general, have densities above that value. Microcellular elastomers intended for energy absorbing applications, e.g., as automotive bumpers, generally are made with densities of 10 to 40 pounds per cubic foot whereas microcellular elastomers intended for other applications, e.g., bumper rub strips, bumper guards, side moldings, appliques and the like where energy absorption is not the prime consideration generally are made with densities of 40 to 60 pounds per cubic foot. Solid, unfoamed polyurethanes usually have a density of about 72 pounds per cubic foot. The densities of the above-described can be increased by the addition of inert fillers such as glass fibers. Such inert fillers provide improved physical properties such as increased modulus. All of these polyurethanes, i.e., foams, microcellular and solid, filled or unfilled, can be improved by the present invention.

When the product being formed is a polyurethane elastomer, an extender can also be added to improve the load bearing and modulus properties of the elastomer. Extenders are not normally used in the production of polyurethane foams, although they can be added, if desired. Suitable extenders include low molecular weight polyols including ethylene glycol, diethylene glycol and the aromatic glycols, reaction products of alkylene oxides with aromatic amines or alcohols having two active hydrogens. Suitable aromatic glycols are the reaction products of alkylene oxides with amino aryl compounds and di(hydroxyalkoxy) aryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and phenol-aromatic amine-aldehyde resins which are made by the reaction of a phenol such as phenol or substituted phenols having at least one unsubstituted reactive position on the aromatic nucleus, an aldehyde such as formaldehyde or other aliphatic aldehydes and an aromatic amine such as aniline or other aromatic amines having at least one or two amino hydrogens and no or one nitrogen-bonded alkyl group and at least one substituted position ortho or para to the amino group.

When the product being formed is a polyurethane microcellular elastomer or foam, this may be accomplished by employing a small amount of a polyurethane blowing agent, such as water, in the reaction mixture (for example, from about 0.1 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoro-methane, dichloromonofluoromethane, dichloromethane, trichloro-methane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed will vary with factors such as the density desired in the foamed product.

It is also within the scope of the invention to employ small amounts, e.g., about 0.01 percent to 5.0 percent by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. No. 3,505,377; U.S. Pat. application Ser. No. 888,067, filed Dec. 24, 1969, and British Patent Specification No. 1,220,471. The latter class of copolymers differs from the above-mentioned polysiloxane-polyoxyalkylene block copolymers in that the polysiloxane moiety is bonded to polyoxyalkylene moiety through carbon-to-oxygen-to-silicon bonds. These various polysiloxane-polyoxalkylene block copolymers preferably contain from 5 to 50 weight percent of polysiloxane polymer with the remainder being polyoxyalkylene polymer.

The polyurethanes produced in accordance with this invention may be advantageously employed in various applications. For example, the present invention is useful in the production of energy-absorbing microcellular polyurethanes. Still further, the polymer/polyols of this invention may be used to form polyurethane elastomers in which relatively low molecular weight polyols must be used to provide the requisite stiffness. Also, polymer/polyols pursuant to this invention may be employed to form polyurethane products for applications where high load-bearing characteristics are required. Polyurethanes produced according to this invention are useful in the applications in which conventional polyurethanes are employed such as in the manufacture of foam for the slab foam market, arm rests, crash pads, mattresses and automobile bumpers.

The following examples are presented. Numbered Examples illustrate this invention. Lettered Examples are comparative Examples and do not illustrate the invention.

The following designations used in the examples and elsewhere herein have the following meanings:

"hrs" denotes hours.
"pts" denotes parts by weight.
"wt-%" denotes percent by weight.
"ratios" are based on weight.
"%" denotes percentage by weight unless otherwise stated.
"calculated hydroxyl numbers" given herein were based on calculated total polymer content and hydroxyl number of base polyol.

"P-1" — Polypropylene oxide-polyethylene oxide triol made from propylene and ethylene oxides and glycerine and having a theoretical number average molecular weight of about 5000 and a hydroxyl number of about 34. The alkylene oxide units are present primarily in blocks and the end units are substantially all ethylene oxide units, i.e., the ethylene oxide is used to "cap" to triol. Based on its total weight, this triol contains about 15 wt-% $C_2H_4O$.

"PP-2" — A 21% copolymer content polymer/polyol of an acrylonitrile-styrene copolymer prepared by polymerizing 50/50 styrene and acrylonitrile in polyol P-1. The polymer/polyol has a theoretical number average molecular weight of about 6000 and a nominal hydroxyl number of about 28.

"PP-3" — A 21% polymer content polymer/polyol of an acrylonitrile polymer prepared by polymerizing acrylonitrile in polyol P-1. The polymer/polyol has a theoretical number average molecular weight of about 6000 and a nominal hydroxyl number of about 28.

"P-4" — An extender formed by reacting 2.4 moles of ethylene oxide per mole of aniline and having a nominal hydroxyl number of 565 and a number average molecular weight of about 198.

"P-5" — Polypropylene oxide triol made from propylene oxide and glycerine and having a theoretical number average molecular weight of about 260 and a nominal hydroxyl number of about 650.

"PI-6" — A prepolymer isocyanate comprising the reaction product of 82.4 wt-% of a mixture of 80% 2,4-tolylene diisocyanate and 20% 2,6-tolylene diisocyanate and 17.6 wt-% polyol P-5. The reaction product is adjusted to an acidity of 0.007 to 0.012% HCl and has a free isocyanate content of 30.7 wt-%.

"PC-7" — Polyol composition containing 85.34 pts. of polymer/polyol PP-2, 8.53 pts. of diethylene glycol, 5.98 pts. of polyol P-4 and 0.15 pts. dibutyltindilaurate catalyst.

"PIC-8" — Prepolymer isocyanate composition comprising a mixture of 83 pts. of prepolymer isocyanate PI-6 and 17 pts. methylene chloride.

"BP-9" — Black pigment paste comprising 14 wt-% carbon black having a particle size of 27 mu and a pH of 6.0 and 86 wt-% polyol P-1.

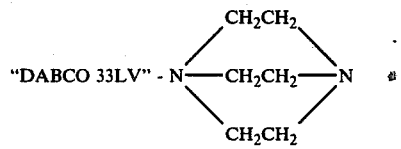

"DABCO 33LV"

"QUV Weathering" — Accelerated weathering provided in a QUV cyclic ultraviolet-weathering tester. The polyurethane elastomer plaques are exposed in alternate periods to ultraviolet light provided by a bank of ultraviolet lamps (Westinghouse FS-40) and water condensation at elevated temperatures. The cycle used herein was 8 hrs. of exposure to ultraviolet light at 120° F. followed by 4 hrs. exposure to condensing humidity at 100° F. This cycle was repeated for 600 hrs. after which time the plaques were examined visually for chalking, dulling or other forms of weathering degradation.

"Net Index of Reflectance (NIR) Determination" — Using an ILD Color-Eye spectrophotometer the index of reflectance value is determined at 560 millimicrons wavelength using a tungsten light source. The determination is first made on the unweathered plaques and then on the weathered plaques. The difference between the index of reflectances of the plaque before and after weathering is the net index of reflectance (NIR) and is a good measure of the level of chalking due to the weathering process. Low NIR values indicate less change in surface appearance due to chalking.

The following ASTM test methods were used in determining the physical properties given in the examples:

| Property | ASTM Method | Specimen Size* |
|---|---|---|
| Overall density | D 1564 | 1"×1"×½" thick |
| Hardness | D 2240 | 1"×1"×½" thick |
| Tensile strength | D 412 | ⅛"–¼" thick |
| Elongation | D 412 | ⅛"–¼" thick |
| DieC tear | D 624C | ⅛"–¼" thick |

*"denotes inch.

EXAMPLES A AND 1–5

To six polymer/polyol compositions each comprising 85.34 parts of polymer/polyol PP-2, 8.53 parts diethylene glycol, 5.98 parts of polyol P-4, and 0.15 parts dibutyltindilaurate catalyst were added 2.0 parts of carbon black paste comprising 14% of carbon black in polyol P-1 and, respectively, 0, 0.1, 0.1, 0.2, 0.5, and 1.0 parts bis-cyclopentadienyl iron (recrystallized ferrocene). The compositions of Examples 3, 4 and 5 also contained 0.1 part of DABCO 33LV. Each composition was heated to 100° F. and then mixed with a stoichiometric amount plus 5% excess (i.e., a sufficient amount to provide a polyurethane having an Index of 105) of the prepolymer isocyanate composition PIC-8. Mixing was accomplished using a 2000 rpm mixer. The liquid urethane mixes were poured into heated (150° F.) ¼ inch × 6 inch × 16 inch aluminum plaque molds in sufficient quantities to form plaques of about 45 pcf density. The finished microcellular urethane elastomer plaques were removed from the mold in 5 minutes. Each contained 0.2 weight percent carbon black and ferrocene levels of 0, 0.07, 0.07, 0.14, 0.35, and 0.7 weight percent, respectively, as shown in Table 1. The plaques were subjected to 600 hours QUV weathering exposure at the following cycle: 8 hrs. UV light at 102° F. followed by 4 hrs. condensing humidity at 100° F. The condition of the weathered plaques was evaluated visually and colorimetrically, and the results are tabulated in Table 1 below. The plaques of Examples 1–5 showed only a dulled surface but no chalking.

TABLE 1

| Example | Ferrocene, wt-% | Surface Appearance | NIR Value |
|---|---|---|---|
| A | 0 | Chalked | 4.1 |
| 1 | 0.07 | No Chalking | 0.3 |
| 2 | 0.07 | No Chalking | 0.4 |
| 3 | 0.14 | No Chalking | 0.3 |
| 4 | 0.35 | No Chalking | 0.2 |

TABLE 1-continued

| Example | Ferrocene, wt-% | Surface Appearance | NIR Value |
| --- | --- | --- | --- |
| 5 | 0.7 | No Chalking | 0.2 |

The phyiscal properties of the plaques were measured before and after QUV exposure and are given in Table 2 below:

TABLE 2

| | Example | | | | | |
| --- | --- | --- | --- | --- | --- | --- |
| Before Exposure: | A | 1 | 2 | 3 | 4 | 5 |
| Overall Density, pcf | 45 | 42 | 42 | 42 | 42 | 42 |
| Hardness, Shore A | 90 | 85 | 87 | 88 | 90 | 88 |
| Tensile Strength, psi | 825 | 755 | 785 | 735 | 665 | 715 |
| Elongation, % | 65 | 75 | 75 | 75 | 60 | 80 |
| Die C Tear, pli | 135 | 140 | 130 | 125 | 125 | 115 |
| After Exposure: | | | | | | |
| Tensile Strength, psi | 1000 | 905 | — | 790 | 850 | 890 |
| Elongation, % | 70 | 85 | — | 65 | 65 | 85 |
| Die C Tear, pli | 120 | 130 | — | 110 | 120 | 115 |

EXAMPLES B AND 6–9

Using the same procedure and materials as Examples A and 1–5, microcellular urethane elastomer plaques were prepared containing 0.2 weight percent carbon black and ferrocene levels of, respectively, 0, 0.035, 0.07, 0.14, and 0.35 weight percent. The plaques were exposed in the QUV tester as in Examples A and 1–5 and evaluated similarly. The results are given in Table 3 below. The plaques of Examples 6–9 showed only a dulled surface but no chalking.

TABLE 3

| Example | Ferrocene, wt-% | Surface Appearance | NIR Value |
| --- | --- | --- | --- |
| B | 0 | Chalked | 2.0 |
| 6 | 0.035 | No Chalking | 0.6 |
| 7 | 0.07 | No Chalking | 0.2 |
| 8 | 0.14 | No Chalking | 0.4 |
| 9 | 0.35 | No Chalking | 0.1 |

EXAMPLES C–I

This series of examples was designed to demonstrate the effect on chalking of incrementally removing the polymer/polyol from an elastomer formulation containing it and relacing it with a polyol containing no polymer. The basic formulation was 85.34 parts polymer/polyol PP-2, 8.53 parts diethylene glycol (chain extender), 5.98 parts polyol P-4, 2.0 parts carbon black paste as described in Examples A and 1–5, 0.15 parts dibutyltindilaurate, and a stoichiometric quantity (plus 5% excess) of prepolymer isocyanate composition PIC-8. The polymer/polyol PP-2 was replaced incrementally with an equal amount of the base polyol P-1, progressing through 20%, 40%, 60%, 80%, and finally 100% P-1 in the formulation. The chain extender components were increased slightly with increasing levels of base polyol P-1 to maintain an elastomer of about the same hardness level. Plaque samples were prepared as in Examples A and 1–5 and were subjected to 600 hours QUV weathering. Results, tabulated below in Table 4, illustrate the influence of polymer/polyol in producing chalk on the black elastomer surface.

TABLE 4

| Example | Polymer/Polyol, wt-%* | Surface Appearance | NIR Value |
| --- | --- | --- | --- |
| C | 100 | Chalked | 4.1 |
| D | 80 | Chalked | 2.2 |
| E | 60 | Lightly Chalked | 1.3 |
| F | 40 | Lightly Chalked | 0.9 |
| G | 20 | No Chalking** | 0.6 |
| H | 0 | No Chalking | 0.6 |
| I | 0 | No Chalking** | 0.5 |

*Weight percent polymer/polyol PP-2 in total mixture of polymer/polyol PP-2 base polyol P-1.
**Dulled surface.

The physical properties of the plaques were measured before and after QUV exposure and are given in Table 5 below:

TABLE 5

| | Example | | | | | | |
| --- | --- | --- | --- | --- | --- | --- | --- |
| Before Exposure: | C | D | E | F | G | H | I |
| Overall Density, pcf | 45 | 45 | 43 | 44 | 41 | 38 | 39 |
| Hardness, Shore A | 90 | 92 | 90 | 88 | 88 | 82 | 85 |
| Tensile Strength, psi | 825 | 800 | 730 | 750 | 665 | 570 | 540 |
| Elongation, % | 65 | 75 | 75 | 90 | 95 | 95 | 65 |
| Die C Tear, pli | 135 | 145 | 130 | 135 | 120 | 115 | 100 |
| After Exposure: | | | | | | | |
| Tensile Strength, psi | 1000 | 885 | 880 | 775 | 850 | 585 | — |
| Elongation, % | 70 | 75 | 95 | 90 | 110 | 75 | — |
| Die C Tear, pli | 120 | 135 | 115 | 115 | 100 | 100 | — |

EXAMPLES J, 10 AND 11

Black elastomer plaques were prepared as described in Examples A and 1–5 except that cobaltocene and nickelocene were added instead of ferrocene. The cobaltocene (a 7.5% solution in toluene) was added at a level of 0.65 parts per 100 parts of the polymer/polyol compositions which resulted in 0.03% of actual cobaltocene in the final elastomer. The nickelocene (a 9.0% solution in toluene) was added at a level of 0.55 parts per 100 parts of the polymer/polyol compositions, giving 0.03% actual nickelocene in the final elastomer. The plaques were weathered in the QUV weathering test for 600 hours. The results given in Table 6 were observed.

TABLE 6

| Example | Cobaltocene, wt-%* | Nickelocene, wt-%* | Surface Appearance | NIR Value |
| --- | --- | --- | --- | --- |
| 1 | 0 | 0 | Chalked | 2.7 |
| 10 | 0.03 | 0 | No Chalking | 1.0 |
| 11 | 0 | 0.03 | Slightly Chalked | 2.2 |

*Based on the total weight of final elastomer.

EXAMPLES 12–17

Red and green elastomer plaques were prepared and tested as described in Examples A and 1–5 except that the plaques were pigmented dark red or green instead of black. Caprolactone-based red and green pigments (Hilton-Davis Ultrakrome Red and Green) were used for pigmentation at a level of 1.0 part pigment per 100 parts of the polymer/polyol compositions. The red pigment comprised 15 wt-% Brilliant Red 2R in polycaprolactone carrier and the green pigment comprised 30 wt-% Phthalocyanine Green B.S. in polycaprolactone carrier. Ferrocene, cobaltocene, or nickelocene were added to the compositions in quantity sufficient to achieve the desired concentrations in the final elastomer, as stipulated in Table 7 (red) and Table 8 (green) given below. In Examples 12, 13, 15 and 16 the amount of chalking was reduced. Best results were obtained from the use of ferrocene. The results given in Tables 7 and 8 were observed after 600 hours in the QUV test.

TABLE 7 (Red)

| Ex-ample | Ferrocene wt-%* | Cobaltocene wt-%* | Nickelocene wt-%* | Surface Appearance | NIR Value |
|---|---|---|---|---|---|
| 12 | .07 | 0 | 0 | No Chalk (darkened) | 1.5 |
| 13 | 0 | .07 | 0 | No Chalk (darkened) | 0.8 |
| 14 | 0 | 0 | .07 | Chalked | 6.6 |

TABLE 8 (Green)

| 15 | .03 | 0 | 0 | No Chalk (darkened) | 0.2 |
|---|---|---|---|---|---|
| 16 | 0 | .07 | 0 | Chalked | 6.9 |
| 17 | 0 | 0 | .07 | Chalked (heavy) | 10.0 |

*Based on the total weight of final elastomer.

EXAMPLES K, 18 AND 19

Black elastomer plaques were prepared as described in Examples A and 1-5 except that cobaltocene and nickelocene were added instead of ferrocene in Examples 18 and 19 and no metallocene was added in Example K. A 7.5% solution of cobaltocene in toluene was added at a level of 1.3 parts per 100 parts of the polymer/polyol composition, giving 0.07% cobaltocene in the final elastomer. A 9.0% solution of nickelocene in toluene was added at a level of 1.1 parts per 100 parts of the polymer/polyol composition, also giving 0.07% of the metallocene in the final elastomer. The black elastomer plaques were exposed in the QUV weathering test for 1200 hours, with the following results:

TABLE 9

| Example | Cobaltocene wt-% | Nickelocene wt-% | Surface Appearance | NIR Value |
|---|---|---|---|---|
| K | 0 | 0 | Chalked | 1.7 |
| 18 | 0.07 | 0 | No Chalk | 0.4 |
| 19 | 0 | 0.07 | Slightly Chalked | 1.3 |

EXAMPLES L, M, 20 AND 21

Elastomer plaques were prepared as described in Examples A and 1-5 except that the plaques were pigmented dark red and dark green, respectively, instead of black. Ultrakrome Red and Ultrakrome Green pigments as described in Examples 11-16 were added at levels of 3.0 parts per 100 parts of the polymer/polyol compositions to achieve the desired pigmentation. Ferrocene was added in Examples 20 and 21 as designated in Tables 10 and 11 below, being mixed at a level of 0.1 part per 100 parts of the polymer/polyol compositions to give 0.07 wt-% ferrocene in the final elastomer. Results of 1200 hours exposure in the QUV weathering test are listed in Tables 10 and 11.

TABLE 10 (red)

| Example | Ferrocene wt-% | Surface Appearance | NIR Value |
|---|---|---|---|
| L | 0 | Chalked | 5.4 |
| 20 | 0.07 | No Chalk (darkened) | 0.9 |

TABLE 11 (green)

| M | 0 | ChaLKED | 1.5 |
|---|---|---|---|
| 21 | 0.07 | No Chalk (darkened) | 0.3 |

EXAMPLES N, 22 AND 23

These examples represent commercial preparations of polyurethane elastomers wherein mixing was accomplished in a small Martin Sweets metering-mixing-dispensing machine. Otherwise, the same procedures and materials as used in Examples A and 1-5 were used in these examples. Example N did not use any metallocene whereas ferrocene was used in Examples 22 and 23 in such amounts as to provide 0.035 and 0.07 wt-% ferrocene, respectively, in the finished microcellular polyurethane elastomer plaques. All of the finished plaques contained 0.2 wt-% carbon black. The plaques were subjected to 643 hours QUV weathering exposure as described in Examples A and 1-5 and were evaluated similarly. The results are given in Table 12 below.

TABLE 12

| Example | Ferrocene wt-%* | Surface Appearance | NIR Value |
|---|---|---|---|
| N | 0 | Chalked | 3.8 |
| 22 | 0.035 | No Chalking | 0.4 |
| 23 | 0.07 | No Chalking | 0.8 |

EXAMPLES O-JJ

These examples illustrate the effects of various commercially available ultraviolet light absorbers, antioxidants and light stabilizers on the chalking properties of polyurethanes. In each of these examples, the same materials and procedures as described in Examples A and 1-5 were used except that, instead of ferrocene, the types and amounts (given in parts per 100 parts of polymer/polyol composition) of UV absorbers, antioxidants and light stabilizers given in Tables 13 and 14 below were used as additives. The black elastomer plaques were exposed in the QUV weathering test for 600 hours and the results and physical properties are given in Table 14. These results show that none of the commercial additives were as effective as ferrocene.

TABLE 13

| Additive | Manufacturer | Commercial Name | Chemical Composition | Function |
|---|---|---|---|---|
| 1 | Ciba Geigy | Tinuvin-P | 2(2'-hydroxy-5'-methyl-phenyl)benzotriazole | UV Absorber |
| 2 | " | Tinuvin-327 | 2(3',5'-ditert-butyl-2'-hydroxyphenyl)-5-chloro-benzotriazole | " |
| 3 | " | Tinuvin-328 | A substituted benzotriazole | " |
| 4 | " | Irganox 1010 | tetrakis[methylene 3-(3',5'-di-t-butyl-4'-hydroxyl-phrnyl)propionate]methane | Antioxidant |
| 5 | " | Irganox 1076 | octadecyl 3-(3',5'-di-tert-butyl-4'-hydroxy-phenyl)propionate | " |
| 6 | Mobay | Absorber 340 | Not Known | UV Absorber |
| 7 | Am. Cyanamid | Cyasorb UV-9 | Not Known | " |

TABLE 13-continued

| Additive | Manufacturer | Commercial Name | Chemical Composition | Function |
|---|---|---|---|---|
| 8 | GAF | UVI-NOX 1494 | Alkylated phenol | Antioxidant |
| 9 | GAF | Uvinul N-35 | ethyl-2-cyano-e,3-diphenyl acrylate | UV Absorber |
| 10 | " | Uvinul D-49 | 2,2'-dihydroxy-4,4'-dimethoxy-benzophenone | " |
| 11 | " | Uvinul D-50 | 2,2',4,4'-tetrahydroxy-benzophenone | " |
| 12 | " | Uvinul T-335 | 2,2',4,4'-tetrahydroxy- | " |
| 13 | " | Uvinul N-539 | 2-ethylhexyl-2-cyano-3,3-diphneyl acrylate | " |
| 14 | Ferro | Ferro AM-101 | A nickel organic compound | Light Stabilizer |
| 15 | " | Ferro AM-105 | A nickel complex thiobis-phenol | " |
| 16 | " | Ferro AM-205 | A nickel organic compound | " |

TABLE 14

| | EXAMPLE | | | | | | | | | | | |
|---|---|---|---|---|---|---|---|---|---|---|---|---|
| Additive | O | P | Q | R | S | T | U | V | W | X | Y | Z |
| 1 | 1.0 | 3.0 | — | — | — | — | — | 0.5 | — | — | 0.5 | — |
| 2 | — | — | 1.0 | 2.0 | — | — | — | — | — | — | — | — |
| 3 | — | — | — | — | 2.0 | — | — | — | — | — | — | — |
| 4 | — | — | — | — | — | 1.0 | 2.0 | 0.5 | — | — | — | — |
| 5 | — | — | — | — | — | — | — | — | 1.0 | 2.0 | 0.5 | — |
| 6 | — | — | — | — | — | — | — | — | — | — | — | 1.0 |
| Physical Properties | | | | | | | | | | | | |
| Overall Density, pcf | 44 | 45 | 46 | 46 | 46 | 45 | 46 | 47 | 46 | 46 | 47 | — |
| Hardness, Shore A | 87 | 89 | 88 | 89 | 88 | 89 | 89 | 87 | 88 | 89 | 88 | — |
| Tensile Strength, psi | 715 | 910 | 875 | 865 | 890 | 905 | 875 | 955 | 880 | 960 | 785 | — |
| Elongation, % | 55 | 85 | 70 | 70 | 80 | 75 | 75 | 97 | 75 | 80 | 65 | — |
| Die C Tear, pli | 130 | 105 | 130 | 125 | 120 | 135 | 120 | 120 | 120 | 125 | 120 | — |
| QUV Exposure Results | | | | | | | | | | | | |
| Surface Appearance | LC* | MC** | MC** | MC** | MC** | MC** | LC* | LC* | LC* | LC* | MC** | VLC*** |
| NIR Value | — | — | — | — | — | — | — | — | — | — | — | 0.7 |

| Additive | AA | BB | CC | DD | EE | FF | GG | HH | II | JJ |
|---|---|---|---|---|---|---|---|---|---|---|
| 7 | 1.0 | — | — | — | — | — | — | — | — | — |
| 8 | — | 1.0 | — | — | — | — | — | — | — | — |
| 9 | — | — | 1.0 | — | — | — | — | — | — | — |
| 10 | — | — | — | 1.0 | — | — | — | — | — | — |
| 11 | — | — | — | — | 1.0 | — | — | — | — | — |
| 12 | — | — | — | — | — | 1.0 | — | — | — | — |
| 13 | — | — | — | — | — | — | 1.0 | — | — | — |
| 14 | — | — | — | — | — | — | — | 1.0 | — | — |
| 15 | — | — | — | — | — | — | — | — | 1.0 | — |
| 16 | — | — | — | — | — | — | — | — | — | 1.0 |
| Physical Properties | | | | | | | | | | |
| Overall Density, pcf | 43 | 46 | 44 | 45 | 40 | 44 | 43 | 43 | 44 | 40 |
| Hardness, Shore A | 87 | 91 | 90 | 91 | 89 | 90 | 89 | 86 | 89 | 81 |
| Tensile Strength, psi | 810 | 820 | 750 | 815 | 795 | 865 | 760 | 795 | 850 | 665 |
| Elongation, % | 80 | 75 | 55 | 70 | 60 | 80 | 70 | 75 | 75 | 70 |
| Die C Tear, pli | 135 | 140 | 135 | 140 | 145 | 125 | 135 | 125 | 135 | 120 |
| QUV Exposure Results | | | | | | | | | | |
| Surface Appearance | LC* | LC* | LC* | LC* | LC* | LC* | LC* | LC* | LC* | LC* |
| NIR Value | 1.9 | 1.0 | 1.1 | 0.9 | 1.2 | 1.3 | 1.1 | 1.1 | 1.0 | 1.0 |

*Light Chalk
**Medium Chalk
***Very Light Chalk

EXAMPLES KK-PP

These examples illustrate the effects of a commercial ultraviolet light stabilizer on the chalking properties of polyurethanes. In each example, the same procedures and materials as described in Examples A and 1-5 were used except that, instead of ferrocene, a hindered amine ultraviolet light stabilizer (Tinuvin 770 made by Ciba Geigy) was used in the amounts set forth in Table 15 given in parts per 100 parts of polymer/polyol composition. The black elastomer plaques were exposed in the QUV weathering test for 600 hours and the results and physical properties are given in Table 15. These results show the effectiveness of Tinuvin to be erratic and unpredictable. Some of the plaques developed chalk streaks that were very noticeable.

TABLE 15

| | EXAMPLE | | | | | |
|---|---|---|---|---|---|---|
| | KK | LL | MM | NN | OO | PP |
| Tinuvin 770* | 1.5 | 1.0 | 1.0 | 1.0 | 0.5 | 0.3 |
| % Tinuvin 770 in Total Urethane | 1.1 | 0.7 | 0.7 | 0.7 | 0.35 | 0.2 |
| Physical Properties, Before Exposure | | | | | | |
| Overall Density, pcf | 45 | 44 | — | — | — | — |
| Hardness, Shore A | 92 | 92 | — | — | — | — |
| Tensile Strength, psi | 1055 | 810 | — | — | — | — |
| Elongation, % | 90 | 70 | — | — | — | — |
| Die C Tear, pli | 125 | 130 | — | — | — | — |
| QUV Exposure Results | | | | | | |
| Surface Appearance | Very | Very | Chalk | Very | Chalk | Very |

TABLE 15-continued

|  | EXAMPLE | | | | | |
|---|---|---|---|---|---|---|
|  | KK | LL | MM | NN | OO | PP |
|  | Light Chalk | Light Chalk | Streak | Light Chalk | Streak | Light Chalk |
| NIR Value | — | — | 0.3 | 1.0 | 0.3 | 0.6 |
| Physical Properties, After Exposure | | | | | | |
| Tensile Strength, psi | 875 | 820 | — | — | — | — |
| Elongation, % | 75 | 80 | — | — | — | — |
| Die C Tear, pli | 130 | 140 | — | — | — | — |

*Parts per 100 parts polymer/polyol composition.

EXAMPLES QQ-DDD

These examples illustrate the effects of carbon black pigments of various particle sizes and pH's. In each of these examples, the same materials and procedures as described in Examples A and 1-5 were used except that no ferrocene was used and the type and amount (parts per 100 parts of the polymer/polyol composition) of carbon black pigment was varied as shown in Tables 16 and 17 below. In Examples RR, TT, VV, XX, ZZ, BBB and DDD, one part of Additive 1 (Tinuvin P) per 100 parts of polymer/polyol composition was used. The black elastomer plaques were exposed in the QUV weathering test for 600 hours and the results and physical properties are given in Table 17. These results show BP-9 to provide the least amount of chalking in the group and this is the reason BP-9 was used in the majority of the examples.

TABLE 16

BP-9 - BP-12 are pastes of 14 wt-% concentrate, and BP-13 is a paste of 33 wt-% concentrate, in polyol P-1 of industrial grade furnace blacks in powder form having the particle sizes and pH's given below and are products of Harwick Chemical Co., Akron, Ohio, under the Stan-Tone name.

| BP | Stan-Tone | Particle Size, mμ | pH |
|---|---|---|---|
| 9 | HCC5562 | 27 | 6.0 |
| 10 | HCC4724 | 24 | 7.0 |
| 11 | HCC5561 | 16 | 8.0 |
| 12 | HCC5563 | 70 | 9.0 |
| 13 | HCC5892 | 27 | 6.0 |

TABLE 17

|  | EXAMPLE | | | | | | |
|---|---|---|---|---|---|---|---|
|  | QQ | RR | SS | TT | UU | VV | WW |
| BP-10 | 1.0 | 1.0 | — | — | — | — | — |
| BP-11 | — | — | 1.0 | 1.0 | 2.0 | 2.0 | — |
| BP-9 | — | — | — | — | — | — | 1.0 |
| BP-12 | — | — | — | — | — | — | — |
| Tinuvin-P - Additive 1 | — | 1.0 | — | 1.0 | — | 1.0 | — |
| Physical Properties, Before Exposure | | | | | | | |
| Overall Density, pcf | 47 | 47 | 47 | 48 | 47 | 47 | 47 |
| Hardness, Shore A | 91 | 88 | 89 | 87 | 86 | 88 | 88 |
| Tensile Strength, psi | 715 | 900 | 885 | 715 | 795 | 750 | 775 |
| Elongation, % | 65 | 100 | 100 | 75 | 90 | 80 | 80 |
| Die C Tear, pli | 120 | 115 | 105 | 115 | 105 | 105 | 105 |
| QUV Exposure Results | | | | | | | |
| Surface Appearance | Heavy Chalk | Heavy Chalk | Heavy Chalk | Heavy Chalk | Medium Chalk | Medium Chalk | Heavy Chalk |
| NIR Values | 5.6 | 5.2 | — | 5.5 | 3.7 | 3.6 | 5.6 |
|  | XX | YY | ZZ | AAA | BBB | CCC | DDD |
| BP-10 | — | — | — | — | — | — | — |
| BP-11 | — | — | — | — | — | — | — |
| BP-9 | 1.0 | 2.0 | 2.0 | — | — | — | — |
| BP-12 | — | — | — | 1.0 | 1.0 | 2.0 | 2.0 |
| Tinuvin-P - Additive 1 | 1.0 | — | 1.0 | — | 1.0 | — | 1.0 |
| Physical Properties, Before Exposure | | | | | | | |
| Overall Density, pcf | 46 | 47 | 48 | 47 | 47 | 48 | 45 |
| Hardness, Shore A | 86 | 87 | 88 | 88 | 88 | 87 | 87 |
| Tensile Strength, psi | 720 | 810 | 935 | 765 | 885 | 720 | 550 |
| Elongation, % | 70 | 90 | 100 | 80 | 95 | 80 | 60 |
| Die C Tear, pli | 110 | 105 | 125 | 110 | 105 | 120 | 95 |
| QUV Exposure Results | | | | | | | |
| Surface Appearance | Medium Chalk | Medium Chalk | Medium Chalk | Heavy Chalk | Heavy Chalk | Heavy Chalk | Medium Chalk |
| NIR Values | 4.5 | — | 3.1 | — | 5.0 | 5.1 | 4.5 |

EXAMPLES EEE-HHH

These examples illustrate the effects of a special commercial carbon black paste composition, Siegle Farben HG8864, made by G. Siegle Company/BASF, Stuttgart, Germany. This material is designated BP-14 in Table 18 below and comprises a 20 wt-% concentrate of Degussa Special Black 4 in bead form having a particle size of 25 mu and a pH of 3.0 in a polyol similar to polyol P-1 as well as one or more unidentified components which appear to be photochemically active. In each of these examples, the same materials and procedures as described in Examples A and 1-5 were used except that BP-14 was substituted for BP-9 and no ferrocene was added. The amounts of BP-14 in parts per 100 parts of the polymer/polyol composition used are given in Table 18. The black elastomer plaques were exposed in the QUV weathering test for 600 hours and the results and physical properties before and after exposure are given in Table 18. The results show no chalking and it has not been conclusively determined whether this is due to the type of carbon black or the unknown components in BP-14.

TABLE 18

|  | EXAMPLE | | | |
| --- | --- | --- | --- | --- |
|  | EEE | FFF | GGG | HHH |
| BP-14 | 2.0 | 2.0 | 4.0 | 6.0 |
| % Carbon Black in Total Urethane | 0.25 | 0.25 | 0.5 | 0.75 |
| Physical Properties, Before QUV Exposure | | | | |
| Overall Density, pcf | 43 | — | 45 | 44 |
| Hardness, Shore A | 90 | — | 91 | 88 |
| Tensile Strength, psi | 770 | — | 705 | 810 |
| Elongation, % | 65 | — | 60 | 75 |
| Die C Tear, pli | 135 | — | 145 | 130 |
| QUV Exposure Results | | | | |
| Surface Appearance | Dulled Surface | Dulled Surface | Dulled Surface | Dulled Surface |
| NIR Value | 0.4 | 0.2 | 0.6 | 0.5 |
| Physical Properties, After QUV Exposure | | | | |
| Tensile Strength, psi | — | — | 925 | 915 |
| Elongation, % | — | — | 65 | 70 |
| Die C Tear, pli | — | — | 120 | 125 |

EXAMPLES III–LLL

These examples illustrate the effects of high amounts of carbon black BP-13 as expressed in Table 19 below in parts per 100 parts of the polymer/polyol composition. In each example, the same materials and procedures as described in Examples A and 1–5 were used except BP-13 was substituted for BP-9 and no ferrocene was used. The black elastomer plaques were exposed in the QUV weathering test for 600 hours and the results and physical properties are given in Table 19. The results show that excessively high amounts of carbon black can reduce chalking although the use of such high amounts results in processing problems due to the extreme thickness of the carbon black pastes.

TABLE 19

|  | EXAMPLE | | | |
| --- | --- | --- | --- | --- |
|  | III | III | KKK | LLL |
| BP-13 | 11.0 | 11.0 | 5.5 | 5.5 |
| % Carbon Black in Total Urethane | 2.5 | 2.5 | 1.3 | 1.3 |
| Physical Properties, Before QUV Exposure | | | | |
| Overall Density, pcf | 45 | 41 | 45 | 44 |
| Hardness, Shore A | 85 | 79 | 83 | 82 |
| Tensile Strength, psi | 715 | 600 | 615 | 750 |
| Elongation, % | 70 | 65 | 65 | 60 |
| Die C Tear, pli | 110 | 100 | 120 | 110 |
| QUV Exposure Results | | | | |
| Surface Appearance | Dulled Surface | Dulled Surface | Dulled Surface | Dulled Surface |

TABLE 19-continued

|  | EXAMPLE | | | |
| --- | --- | --- | --- | --- |
|  | III | III | KKK | LLL |
| NIR Value | 0.3 | 0.2 | 0.3 | 0.1 |

EXAMPLES MMM–OOO

These examples provide control formulations to aid in evaluating the results of the other examples. In each of these examples, the same procedures and materials as described in Examples A and 1–5 were used except that no ferrocene was used. The black elastomer plaques were exposed in the QUV weathering test for 600 hours and the results and physical properties, before and after exposure, are given in Table 17. Also given are the average properties for the control formulations of these examples and Example A.

TABLE 20

|  | EXAMPLE | | | | Average Control Properties |
| --- | --- | --- | --- | --- | --- |
|  | MMM | NNN | OOO | A | |
| Physical Properties, Before QUV Exposure | | | | | |
| Overall Density, pcf | 47 | — | 44 | 45 | 45 |
| Hardness, Shore A | 87 | — | 85 | 90 | 87 |
| Tensile Strength, psi | 810 | — | 700 | 825 | 780 |
| Elongation, % | 90 | — | 70 | 65 | 75 |
| Die C Tear, pli | 105 | — | 125 | 135 | 120 |
| QUV Exposure Results | | | | | |
| Surface Appearance | Medium Chalk | Medium Chalk | Light Chalk | Medium Chalk | Medium Chalk |
| NIR Value | — | — | 2.1 | 4.1 | 3.1 |
| Physical Properties, After QUV Exposure | | | | | |
| Tensile Strength, psi | — | — | 825 | 1000 | 910 |
| Elongation, % | — | — | 80 | 70 | 75 |
| Die C Tear, pli | — | — | 110 | 120 | 115 |

EXAMPLES PPP–TTT

These examples are similar to Examples C–I in illustrating the effect on chalking of incrementally removing the polymer/polyol from an elastomer formulation containing it and replacing it with a polyol containing no polymer. The basic formulation is shown in Table 21 as Example PPP. The polymer/polyol PP-3 was replaced incrementally with an equal amount of the base polyol P-1. The chain extender components, diethylene glycol and P-4, were increased slightly with increasing levels of base polyol, P-1, to maintain an elastomer of about the same hardness level. The procedures described in Examples A and 1–5 were used. The black elastomer plaques were exposed in the QUV weathering test for 600 hours and the results and physical properties before and after exposure are given in Table 21.

TABLE 21

|  | EXAMPLE | | | | |
| --- | --- | --- | --- | --- | --- |
|  | PPP | QQQ | RRR | SSS | TTT |
| Polymer/polyol PP-3 | 85.47 | 67.2 | 49.8 | 32.8 | 16.2 |
| Polyol P-1 | — | 16.8 | 33.2 | 49.2 | 64.8 |
| Diethylene glycol extender | 8.55 | 9.41 | 10.0 | 10.59 | 11.18 |
| Polyol P-4 | 5.98 | 6.59 | 7.0 | 7.41 | 7.82 |
| BP-9 | 2.0 | — | — | — | — |
| Prepolymer isocyanate PIC-8, Index | 105 | — | — | — | — |
| Polymer/polyol, wt-% of PP-3 + P-1 | 100 | 80 | 60 | 40 | 20 |
| Physical Properties, Before QUV | | | | | |

TABLE 21-continued

| | \multicolumn{5}{c}{EXAMPLE} | | | | |
| --- | --- | --- | --- | --- | --- |
| | PPP | QQQ | RRR | SSS | TTT |
| Exposure | | | | | |
| Overall Density, pcf | 45 | 41 | 41 | 40 | 45 |
| Hardness, Shore A | 36D | 89 | 92 | 86 | 91 |
| Tensile Strength, psi | 940 | 780 | 685 | 605 | 815 |
| Elongation, % | 75 | 70 | 85 | 85 | 90 |
| Die C Tear, pli | 160 | 145 | 140 | 130 | 155 |
| QUV Exposure Results | | | | | |
| Surface Appearance | Heavy Chalk | Medium Chalk | Light Chalk | Dulled Surface | Dulled Surface |
| NIR Value | 8.7 | 1.6 | 1.3 | 0.6 | 0.6 |
| Physical Properties, After QUV Exposure | | | | | |
| Tensile Strength, psi | 1020 | 875 | 735 | 805 | 795 |
| Elongation, % | 85 | 85 | 65 | 95 | 80 |
| Die C Tear, pli | 130 | 125 | 110 | 100 | 115 |

EXAMPLES UUU, 24 AND 25

To three polymer/polyol compositions each comprising 85.34 parts of polymer/polyol PP-2, 8.53 parts diethylene glycol, 5.98 parts of polyol P-4, and 0.15 parts dibutyltindilaurate catalyst were added 2.0 parts of carbon black paste comprising 14% of carbon black in polyol P-1 and, respectively, 0, 0.5 and 1.0 parts of DFR-121, a product purchased from Arapahoe Chemical Company and believed to contain about 2 weight percent of a 2,2-diferrocenylpropane polymer as prepared pursuant to Preparation 1 disclosed in U.S. Pat. No. 3,927,881 (Cols. 5 and 6). The balance of DRF-121 is a chloroparaffin which should have no effect on the weathering-induced chalking of the final polyurethane elastomer, although the precise identity of the chloroparaffin component has not been determined. The proportion of 2,2-diferrocenylpropane polymer in each polymer/polyol composition thus comes to about 0, 0.01 and 0.02 weight percent, respectively. Each composition was heated to 100° F. and then mixed with a stoichiometric amount plus 5% excess (i.e., a sufficient amount to provide a polyurethane having an Index of 105) of the prepolymer isocyanate composition PIC-8. Mixing was accomplished using a 2000 rpm mixer. The liquid urethane mixes were poured into heated (150° F.) ¼ inch × 6 inches × 16 inches aluminum plaque molds in sufficient quantities to form plaques of about 45 pcf density. The finished microcellular urethane elastomer plaques were removed from the mold in 5 minutes. Each contained 0.2 weight percent carbon black. The plaques were subjected to 1000 hours QUV weathering exposure at the following cycle: 8 hrs. UV light at 120° F. followed by 4 hrs. condensing humidity at 100° F. The condition of the weathered plaques was evaluated visually and colorimetrically, and the results are tabulated in Table 22 below. The plaques of Examples 24 and 25 showed no chalking.

TABLE 22

| Example | DRF-121, wt. %* | Ferrocene Polymer, wt. %* | Ferrocene Polymer, wt. %** | Surface Appearance | NIR Value |
| --- | --- | --- | --- | --- | --- |
| UUU | 0 | 0 | 0.0 | Chalked | 4.2 |
| 24 | 0.5 | 0.01 | 0.007 | Trace of Chalk | 2.0 |
| 25 | 1.0 | 0.02 | 0.014 | No Chalk | 1.0 |

*In polymer/polyol composition (approximate)
**In final polyurethane elastomer (approximate)

What is claimed is:

1. In a polymer/polyol composition which is convertible by reaction with a polyisocyanate to a polyurethane which is pigmented to a medium to dark color and which chalks upon exposure to weather and wherein the polymer of said polymer/polyol is dispersed in the polyol thereof and made from one or more polymerizable ethylenically unsaturated monomers, the improvement providing to said polyurethane resistance to chalking on exposure to weather comprising the presence in said polymer/polyol composition of a metallocene from the class consisting of ferrocene, a ferrocene derivative, cobaltocene and nickelocene in an amount effective to provide chalk resistance.

2. In a polymer/polyol composition which is convertible by reaction with a polyisocyanate to a polyurethane which is pigmented to a dark color and which chalks upon exposure to weather and wherein the polymer of said polymer/polyol is formed in situ in, and is dispersed in, the polyol thereof from one or more polymerizable ethylenically unsaturated monomers, the improvement providing resistance to chalking to said dark color-pigmented polyurethane on exposure to weather comprising, the presence of ferrocene or a ferrocene polymer in said polymer/polyol composition in an amount effective to provide chalk resistance.

3. Composition as claimed in claim 2 wherein ferrocene is present and in the amount of about 0.035 to about 2.5 weight percent based on the weight of said polyurethane.

4. Composition as claimed in claim 2 wherein there is included a low molecular weight polyol as a chain extender.

5. Composition as claimed in claim 4 wherein said chain extender is an aromatic or aliphatic glycol.

6. Composition as claimed in claim 2 wherein the amount of polymer dispersed in said polyol is about 4 to about 40 weight percent based on the weight of the polymer/polyol composition.

7. Composition as claimed in claim 2 wherein the amount of polymer dispersed in said polyol is about 15 to about 35 weight percent based on the weight of the polymer/polyol composition.

8. Composition as claimed in claim 7 wherein said polymer comprises polymerized acrylonitrile.

9. Composition as claimed in claim 8 wherein said polymer comprises polymerized acrylonitrile and polymerized styrene in a weight ratio of from 20:80 to 100:0.

10. Composition as claimed in claim 9 wherein the weight ratio of polymerized acrylonitrile to polymerized styrene in said polymer ranges from about 60:40 to 85:15.

11. Composition as claimed in claim 2 wherein said polyurethane is pigmented black with carbon black.

12. Composition as claimed in claim 2 wherein said composition contains a catalyst for the polyurethane-forming reaction.

13. Composition as claimed in claim 2 wherein said composition contains a dark colored pigment.

14. Composition as claimed in claim 13 wherein said pigment is a dark red pigment.

15. In a polyisocyanate composition which is convertible by reaction with a polymer/polyol to a polyurethane which is pigmented to a dark color and which chalks upon exposure to weather and wherein the polymer of said polymer/polyol is formed in situ in, and is dispersed in, the polyol thereof from one or more polymerizable ethylenically unsaturated monomers, the improvement providing resistance to chalking to said dark color-pigmented polyurethane on exposure to weather comprising the presence of ferrocene or a ferrocene polymer in said polyisocyanate composition.

16. Composition as claimed in claim 15 wherein ferrocene is present and in the amount of about 0.035 to about 0.7 weight percent based on the weight of said polyurethane.

17. Composition as claimed in claim 15 wherein said polyisocyanate composition contains a blowing agent.

18. A method for producing a dark colored polyurethane by reacting a mixture comprising (a) a polymer/polyol composition as claimed in claim 2 and (b) an organic polyisocyanate, in the presence of (c) a catalyst for the reaction of (a) and (b) and a dark pigment to produce the polyurethane.

19. A method for producing a dark colored microcellular polyurethane elastomer by reacting and foaming a mixture comprising (a) the polymer/polyol composition claimed in claim 2, (b) an organic polyisocyanate, (c) a catalyst for the reaction of (a) and (b) to produce the polyurethane, (d) a blowing agent, (e) a foam stabilizer and (f) a dark pigment.

20. A method as claimed in claim 19 wherein the microcellular elastomer is flexible, the reaction and foaming are performed by the one shot technique, the polymer/polyol composition contains an alkylene oxide adduct of a polyhydroxyalkane, and a low molecular weight polyol chain extender, the blowing agent is methylene chloride used in an amount to provide a foam having a density of 10 to 60 pounds per cubic foot, and the dark pigment is carbon black.

21. Polyurethane produced by the method claimed in claim 18.

22. Composition as claimed in claim 2 wherein a ferrocene polymer is present and in the amount of about 0.007 to about 0.7 weight percent based on the weight of said polyurethane.

23. Composition as claimed in claim 22 wherein said ferrocene polymer is 2,2-diferrocenylpropane polymer.

24. Composition as claimed in claim 15 wherein a ferrocene polymer is present and in the amount of about 0.007 to about 0.7 weight percent based on the weight of said polyurethane.

25. Composition as claimed in claim 24 wherein said ferrocene polymer is 2,2-diferrocenylpropane polymer.

* * * * *

UNITED STATES PATENT OFFICE
CERTIFICATE OF CORRECTION

Patent No. 4,143,002          Dated March 6, 1979

Inventor(s) W.A. Gill

It is certified that error appears in the above-identified patent and that said Letters Patent are hereby corrected as shown below:

In column 16, line 46, for the first entry in the Table 6 column headed "Example", for "1" read -- J --.

Between columns 19 and 20, in the fourth line, for the second entry in the Table 13 column headed "Chemical Composition", for ethyl-2-cyano-e,3-diphenyl acrylate" read -- ethyl-2-cyano-3,3-diphenyl acrylate --, and in the tenth line, for the fifth entry in the Table column headed "Chemical Composition", for "2,2',4,4'-tetrahydroxy-" read -- a substituted benzotriazole --.

Signed and Sealed this

Twelfth Day of June 1979

[SEAL]

Attest:

RUTH C. MASON
Attesting Officer

DONALD W. BANNER
Commissioner of Patents and Trademarks